Sept. 30, 1969  R. J. W. TER HORST  3,469,643
DRILL, PARTICULARLY FOR ROTARY PERCUSSION DRILLING
Filed May 9, 1967

INVENTOR.
Roelof Jan Willem Ter Horst
BY
Mason, Porter, Diller & Brown
ATTORNEYS United States Patent Office 3,469,643
Patented Sept. 30, 1969

3,469,643
DRILL, PARTICULARLY FOR ROTARY
PERCUSSION DRILLING
Roelof Jan Willem Ter Horst, Enschede, Netherlands,
assignor to Netherlands Tool Manufacturing Co., Hengelo, Netherlands, a corporation of the Netherlands
Filed May 9, 1967, Ser. No. 637,116
Claims priority, application Germany, June 8, 1966,
N 28,656
Int. Cl. E21c 13/04, 13/00, 13/06
U.S. Cl. 175—394                                10 Claims

ABSTRACT OF THE DISCLOSURE

A masonry drill having a reduced peripheral surface area to reduce friction with the wall of the drill hole, a carbide tip not exceeding the diameter of the fluted part of the drill to avoid poor centering, the diameter of the shank portion being smaller than the diameter of the fluted part to permit holes of any depth being drilled while retaining proper removal of the drillings. The design of the drill permits its manufacture by means of forging rather than cutting.

---

This invention relates to a drill, particularly a masonry drill for axial percussion drilling and/or rotary drilling, particularly for rotary percussion drilling.

The performance of drills of the above-mentioned kind depends in essence on the shape and number of the flutes of the drill. For the influencing factors are the generation of heat and the discharge of the drillings.

Both problems cannot be satisfactorily solved with conventional masonry drills.

Conventionally, indeed, the drills employed in masonry drilling have resembled, in their outward appearance, the well-known twist drills used in the metal-working industry.

These drills exhibit one or two relatively steeply rising flutes for the removal of drillings, which flutes have been cut in the body and terminate in a tungsten carbide tip at the drilling end of the drill. The flutes are not disposed closely together, but spaced rather a large distance from each other, so that a cylindrical surface of substantial width is in contact with the inner wall of the drill hole. This produces considerable frictional heat, which renders prolonged drilling with the same drill impossible. As a result of the fact that the fluted part of the drill has the same outer diameter as the shank, the drilling of deeper holes is impossible. As soon as the fluted part has disappeared into the drill hole, removal of drillings becomes impossible.

There are also forms in which the radial dimension of the carbide tip at the end of the drill exceeds the outline diameter of the fluted part. These, however, have the disadvantage of poor centering of the drill in the material. Furthermore, the removal of the drillings is unsatisfactory.

Effort has been made to improve the removal of drillings by giving the discharging spiral such a shape that it practically acts as a collecting channel leading upwardly. This proposal, however, cannot lead to satisfactory results either, since the problem of undue heat generation is not solved with this shape.

It is an object of the present invention to provide an improved drill to avoid the above disadvantages.

The invention is based on the appreciation that the performance of a masonry drill can be substantially enhanced if the drilling end and the outer surfaces of the flutes are correspondingly shaped. According to the invention, there is provided a drill having a fluted portion terminating in a carbide tip, the cutting edges of which define an obtuse angle between them, the width of said tip not exceeding the diameter of said fluted portion, the inwardly curved outer surfaces of the latter terminating in the respective, opposing larger outer surfaces of said tip.

According to another feature of the invention, the drill has secondary flutes intermediate two primary flutes, of such shape that no smooth outer surfaces are formed, but the flutes rather define an acute angle between them. The resulting edge or ridge is preferably rounded to reduce friction in drill hole wall contact and thus avoid premature wear. The drilling end of the drill does not exceed the radial outline dimension of the fluted portion, the shank being smaller in diameter than said fluted portion, and the angle of pitch of the flutes being preferably no more than 45°. At least part of the shank is preferably knurled to resist slip in a chuck.

The invention is illustrated in the accompanying drawings, in which.

Figure 1:
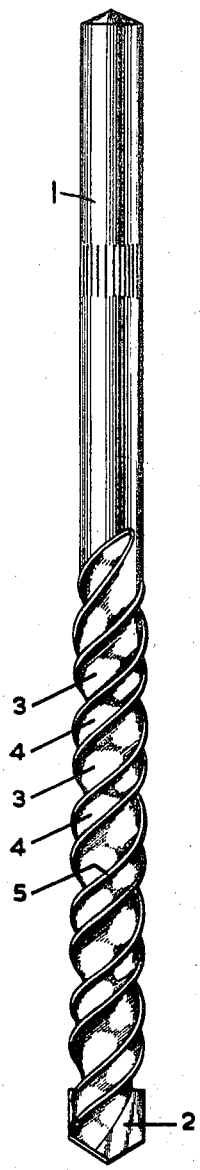
FIGURE 1 is an enlarged showing of a drill according to the invention.
Figure 2:
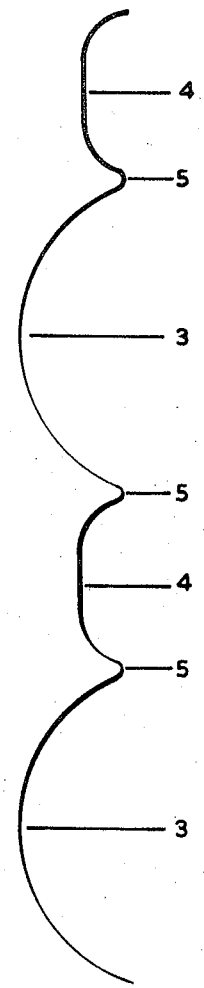
FIGURE 2 is an enlarged diagrammatic view showing the configuration of the successive flutes in section longitudinally of the drill.

Referring to the drawings, the drill has a shank 1 of a diameter smaller than the outline diameter of the remainder of the drill, and a tungsten carbide tip 2 at the drilling end, formed with an obtuse angle, and of a width not exceeding the outline diameter of the fluted portion of the drill. Said fluted portion has two primary flutes 3 and two secondary flutes 4, which flutes are contiguous to one another, defining acute angles between them to form ridges 5, which, as best shown in FIGURE 2, are preferably rounded to reduce friction in drill hole wall contact and avoid undue wear.

The cross-sectional configuration of the secondary flute is preferably not semicylindrical, but rather exhibits a generally flat center potrion with sidewalls rising steeply towards the ridge 5.

Every single one of these features has advantage over and above the prior drills.

An optimum effect is obtained however, when all of the features are used in combination. Comparative tests have shown that the drill is superior to all conventional drills. The removal of drillings, which is particularly important if holes have to be drilled in the vertically downward direction, is 50% higher. Generation of heat from contact with the drill hole is only 20% as compared with conventional drills. Drill holes of any depth can be drilled. The depth only depends on the length of the body. It is not necessary to interrupt the drilling operation, either for reasons of drillings removal or for reasons of overheating. The special shape of the flutes renders the drill extremely sturdy. In addition, the shape of the flutes according to the invention permits manufacture of the fluted portion of the drill by means of forging, whereas conventional drills have had to be cut. One obvious advantage of this feature is that the structure of the drill is improved by the forging treatment.

I claim:

1. A drill, particularly for rotary percussion drilling in stone, brick, and concrete, having a spirally fluted portion terminating in a tungsten carbide tip (2) having cutting edges, the cutting edges defining an obtuse angle between them, and the width of said tip not exceeding the diameter of said fluted portion.

2. A drill, particularly for rotary percussion drilling in stone, brick and concrete, having a zuted portion formed with at least two larger primary flutes (3) and at least two smaller secondary flutes (4), said fluted portion terminating in a tungsten carbide tip (2) having cutting edges, the cutting edges defining an obtuse angle between them, the width of said tip not exceeding the diameter of said fluted portion.

3. A drill according to claim 2, wherein the flutes (3, 4) are arranged closely together to form rounded acute-angled ridges effective to reduce friction with the wall of the drill hole as it is drilled.

4. A drill according to claim 2, wherein the flutes (3, 4) are arranged closely together to form rounded acute-angled ridges (5) effective to reduce friction with the wall of the drill hole as it is drilled, the cross-sectional configuration of the secondary flutes (4) presenting a generally flat central portion with the sidewalls rising steeply towards the ridges (5).

5. A drill according to claim 2, wherein the cross-sectional configuration of the secondary flutes presents a generally flat central portion with the sidewalls rising steeply towards the ridges.

6. A drill according to claim 2, wherein the flutes have a pitch angle which is small, preferably no more than 45°.

7. A drill according to claim 2 having a shank (1) of a diameter slightly inferior to the outline diameter of said fluted portion.

8. A drill as defined in claim 2 wherein the secondary flutes are disposed intermediately of primary flutes.

9. A drill, particularly for rotary percussion drilling in stone, brick, and concrete, having a fluted portion formed with at least two larger primary flutes (3) and at least two smaller secondary flutes (4), said fluted portion terminating in a tungsten carbide tip (2) having cutting edges, the cutting edges defining an obtuse angle between them, the width of said tip not exceeding the diameter of said fluted portion, said flutes being arranged closely together to form rounded acute-angled ridges effective to reduce friction with the wall of the drill hole as it is drilled, said drill having a shank (1) of a diameter slightly inferior to the outline diameter of said fluted portion, said shank comprising a knurled part to resist slip in a chuck.

10. A drill according to claim 9, wherein the flutes have a relatively small pitch angle, preferably no more than 45°.

References Cited
UNITED STATES PATENTS

| | | | |
|---|---|---|---|
| 2,210,296 | 8/1940 | Kittrell et al. | 175—323 X |
| 2,237,383 | 4/1941 | Agostineto | 175—394 X |
| 2,425,132 | 8/1947 | Stokes | 175—394 |
| 2,635,856 | 4/1953 | Scheffer | 175—394 |
| 2,673,716 | 3/1954 | Avery | 175—410 |
| 2,679,382 | 5/1954 | Schmidt | 175—410 |

CHARLES E. O'CONNELL, Primary Examiner

RICHARD E. FAVREAU, Assistant Examiner

U.S. Cl. X.R.

175—410, 415